United States Patent Office 3,329,621
Patented July 4, 1967

3,329,621
GENERATING VISIBLE LIGHT FROM
CHEMICAL ENERGY
Michael McKay Rauhut, Norwalk, and Andrew Milo
Semsel, Ridgefield, Conn., assignors to American Cyanamid Company, Stamford, Conn., a corporation of Maine
No Drawing. Filed Mar. 25, 1965, Ser. No. 442,802
19 Claims. (Cl. 252—188.3)

This is a continuation-in-part of Ser. No. 334,648, filed Dec. 30, 1963, now abandoned.

The present invention relates to novel compositions of matter and reactions for the direct generation of light from chemical energy. The art of generating light from chemical energy, i.e., chemiluminescence, is continually in search of compositions which when reacted substantially improve the intensity and lifetime of light emission. Obviously, improved compositions are constantly in demand for use as signal devices, for area illumination, etc.

The term "chemiluminescent reactant" as used herein means a mixture which when in the presence of a suitable fluorescer will result in a chemiluminescent reaction (1) independently or (2) when reacted with other necessary reactants in the processes as disclosed herein.

The term "chemiluminescent composition" as used herein means a mixture which includes chemiluminescent reactants, which includes the presence of a suitable fluorescer and which will result in chemiluminescence.

The term "admixing" as used herein means "reacting" or sufficiently bringing together component reactants to obtain a chemiluminescent reaction.

The term "peroxide compound" as used herein includes a typical peroxide and also includes compounds which upon reaction produce the peroxide group.

The term "hydroperoxide" group, as used herein, represents (a) a peroxide compound which includes at least one (1) HOO— group, (2) ROO— group or (3)

groups, or (b) a composition which upon reaction produces such a peroxide compound, where typical hydroperoxides are ROOH, and HOOH. R is defined below, in the disclosure relating to dehydrating agents.

The term "hydrogen peroxide compound" includes (1) hydrogen peroxide and (2) hydrogen peroxide-producing compounds.

By "non-reactive diluent" is meant a diluent which will not react in a manner which will defeat the chemiluminescent reaction.

The term "diluent," as used herein, means a solvent or a vehicle which when employed with a solvent does not cause insolubility.

The term "fluorescent compound" means (1) a compound which is a fluorescer and/or (2) a compound which upon reaction produces a fluorescer compound.

The term "solid," as used herein, refers to a state in which the materials are in the absence of a solvent such as water or other diluent, and the material may be virtually in the form of a single solid state, or of lumps, or of ground or crushed particles, or of a powdery material.

It has been found, pursuant to the instant discovery that visible light of appreciable duration and superior intensity may be produced by admixing (1) a dicarboxylic acid of the typical formula:

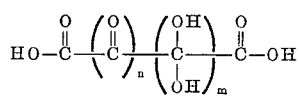

wherein n and m are each any integer less than about 11, including zero, respectively, (2) an anhydrous hydroperoxide, (3) a fluorescent compound, (4) a diluent, and (5) a dehydrating agent selected from the group consisting of (a) a carbodiimide of the typical formula RN=C=NR′ wherein R and R′ each respectively represent alkyl ($C_1$–$C_{16}$), aryl, cycloalkyl, heterocyclic, substituted alkyl, substituted aryl, substituted cycloalkyl, or substituted heterocyclic, (b) an anhydride of a carboxylic acid, (c) an isocyanate, (d) an anhydride or an R-substituted carboxylic acid wherein R is as defined above, and (2) an R-substituted isocyanate wherein R is as defined above. Where any R or R′ is of fluorescent compound substituent or where the hydroperoxide is a fluorescent compound-substituted hydroperoxide, a separate fluorescer is not required.

Typical dicarboxylic acids of the above formula include acids such as oxalic, ketomalonic, dihydroxy tartaric, triketo glutaric, tetraketo adipic, and the like.

Typical hydroperoxides include peroxides such as tertiarybutyl hydroperoxide, peroxylauric acid, tetralin hydroperoxide, cumenehydroperoxide, cyclohexanone hydroperoxide, peroxybenzoic acid, 1-ethylcyclohexane hydroperoxide, 1-methylcyclohex-2-ene-hydroperoxide, n-butyl hydroperoxide, peroxy-4-chlorobenzoic acid, 1-phenyl-1-methyl-propyl hydroperoide, 2-butanone-3-hydroperoxide, allyl hydroperoxide, triethylmethyl hydroperoxide, 9-xanthenyl hydroperoxide, 9,10 - diphenyl-9,10-dihydroanthracene- 9,10-dihydroperoxide, indole-3-hydroperoxide, 1,2,3,4-tetrahydrocarbazole-4a-hydroperoxide, 9 - amino-10-phenylanthracene - 10 - hydroperoxide, hydrogen peroxide, and the like.

Anhydrous hydrogen peroxide employed may be prepared from aqueous 90% $H_2O_2$ in a conventional manner, or it may be generated in situ from a perhydrate, for example. Typical perhydrates are perhydrate of urea (urea peroxide), perhydrate of pyrophosphate (sodium pyrophosphate peroxide), perhydrate of histidine (histidine peroxide), and the like. Still another form in which the anhydrous $H_2O_2$ may be provided in the composition is that of an anhydrous solution of $H_2O_2$ in a suitable solvent, such as an ether, an ester, an aromatic hydrocarbon, etc. of the type defined hereinafter and referred to hereinabove as a diluent in the composition.

Typical diluents within the purview of the instant discovery are those which do not react readily with the hydroperoxide nor with the dicarboxylic acid of this invention. In addition, the hydroperoxide must be at least partially soluble in these diluents, for example, at least one gram of $H_2O_2$ per liter of diluent. The following are illustrative diluents or solvents: non-cyclic or cyclic ethers, such as diethyl ether, diamyl ether, diphenyl ether, anisole, tetrahydofuran, dioxane, and the like; esters, such as ethyl acetate, propyl formate, amyl acetate, dimethyl phthalate, diethyl phthalate, methyl benzoate, and the like; aromatic hydrocarbons, such as benzene, xylene, toluene, and the like.

The fluorescent compounds contemplated herein are numerous and they may be defined broadly as those which do not readily react on contact with the peroxide of this invention; likewise, they do not readily react on contact with the dicarboxylic acid defined above. Typical suitable fluorescent compounds for use in the present invention are those which have a spectral emission falling between 330 millimicrons and 700 millimicrons and which are at least partially soluble in any of the above diluents. Among these are the conjugated polycyclic aromatic compounds having at least three fused rings, such as: anthracene, substituted anthracene, benzanthracene, phenanthrene, substituted phenanthrene, naphthacene, substituted naphthacene, pentacene, substituted pentacene, pentaphenyl phosphole, and the like. Typical substituents for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well known in the art, such as, for example, trans-stilbene, 1,3-diphenyl isobenzofuran, pentaphenyl phosphole oxide, 10-methyl-9-acridanone, and the like. Many typical fluorescer compounds are fully described in "Fluorescence and Phosphorescence," by Peter Pringsheim, Interscience Publishers, Inc., New York, N.Y., 1949. While only typical fluorescent compounds are listed hereinabove, the person skilled in the art is fully aware of the fact that the invention is not so restricted and that numerous other fluorescent compounds having similar properties are contemplated herein.

As broadly stated above, the fluorescer compound may be a substituent to any one or more of the above hydroperoxides, or dehydrating agents. A typical example would be a dimethyl-2-antracenylmethyl substituent, and a typical compound employing such a substituent would be dimethyl-2-anthracenylmethane hydroperoxide. Another typical fluorescer-peroxide compound is 2-carboperoxyanthracene.

Typical diluents within the purview of the instant discovery (1) are those that do not frustrate the production of the chemiluminescent light of this invention.

It has been found that the molar (moles per liter of diluent) concentrations of the major components of the novel composition hereinabove described may vary considerably. The dicarboxylic acid (A) concentration is in the range $10^{-4}$ to 4, preferably $10^{-3}$ to 1; the hydroperoxide (B) concentration from $10^{-3}$ to 10, preferably $10^{-2}$ to 2; the fluorescent compound (C) from $10^{-5}$ to 5, preferably $10^{-1}$ to 1; the dehydrating agent (D) concentration from $1.5 \times 10^{-4}$ to 8, i.e., generally, for best results, at least about 2 moles of (D) per mole of (A); and, of course, the diluent (E) provides the remainder. These are final concentrations.

In preparing the novel chemiluminescent compositions of the present invention, very good results are obtained when the carbodiimide is added last, although this is not critical. The fluorescent compounds should not be added last, since chemical reaction but not light emission takes place in the absence of a fluorescent compound.

It has been further found, pursuant to the instant discovery, that addition of a small but effective amount of anhydrous acid catalyst, e.g., sufficient to provide from about $10^{-4}$ to about 1 molar concentration (moles per liter of diluent), to the chemiluminescent compositions contemplated herein significantly enhances the visible light emitted. A wide variety of organic and inorganic acids is contemplated, typical acids being: alkane sulfonic acids, such as methane sulfonic acid, ethane sulfonic acid, butane sulfonic acid, and the like; aryl sulfonic acids, such as benzene sulfonic acid, para-toluene sulfonic acid, phenyl sulfonic acid, and the like; acetic acid, trifluoroacetic acid, benzoic acid and the like; mineral acids, such as HCl, $HNO_3$, $H_2SO_4$ and pyrophosphoric; Lewis acids, including $AlCl_3$, etc.; perchloric acid; borontrifluoride; organo-phosphorus acids, such as phenylphosphonic acid, and the like; etc.

According to a particular feature of the present invention, it has been discovered that if components (A), (B), (C) and (D) are solids they may be blended as such and a sufficient quantity of the liquid diluent added whenever a reaction is desired. The advantages are obvious insofar as storage, transportation and use are concerned. Typically, a homogeneous mixture of oxalic acid, urea peroxide, 9,10-diphenyl anthracene, para-toluenesulfonic acid, and dicyclohexylcarbodiimide may be prepared and added to a diluent, such as diethyl ether, whenever reaction is desired. By the same token, the diluent may be added to the mixture of solids.

The following examples are intended to illustrate the present invention and the limitations contained therein are similarly illustrative, the invention not being limited thereto except insofar as these limitations appear in the appended claims.

TABLE I

| Ex. No. | Acid | Conc. | Peroxide | Conc. | Fluorescent Compound | Conc. | Dehydrating Agent | Conc. | Diluent | Anhydrous Acid Catalyst | Conc. |
|---|---|---|---|---|---|---|---|---|---|---|---|
| I | Oxalic | 0.5 | Tert. butyl hydroperoxide. | 1 | Anthracene | $10^{-3}$ | Cyclohexyl carbodiimide. | 1 | Diethyl phthalate. | Methane sulfonic acid. | $10^{-3}$ |
| II | Ketomalonic | $2 \times 10^{-1}$ | Peroxy lauric acid. | $10^{-1}$ | 9,10-diphenyl anthracene. | $5 \times 10^{-3}$ | O-toluic anhydride. | $10^{-1}$ | Anisole | Phenyl phosphonic acid. | $5 \times 10^{-4}$ |
| III | Oxalic | $2 \times 10^{-3}$ | Tetralin hydroperoxide. | $10^{-3}$ | Pentacene | $10^{-5}$ | Phenyl isocyanate. | $10^{-2}$ | Amyl acetate. | Benzene sulfonic acid. | $10^{-1}$ |
| IV | Dihydroxy tartaric. | 1 | Cumene hydroperoxide. | 1 | Napthacene | $5 \times 10^{-3}$ | Acetic anhydride. | 4 | Diamyl ether. | Trifluoro acetic acid. | 1 |
| V | ...do... | $5 \times 10^{-2}$ | Cyclohexanene hydroperoxide. | $5 \times 10^{-2}$ | Benzathracene. | $10^{-2}$ | Trifluoro acetic anhydride. | $10^{-1}$ | Ethyl acetate. | None | |
| VI | Triketo glutaric. | 0.2 | Peroxy benzoic acid. | 0.5 | Rubrene | $10^{-5}$ | Octyl isocyanate. | 0.5 | Tetrahydrofuran. | HCl | 0.5 |
| VII | Tetraketo adipic. | $5 \times 10^{-2}$ | 1-ethylcyclohexane hydroperoxide. | 0.2 | Trans stilbene. | $10^{-3}$ | Benzoic anhydride. | 0.2 | Diethyl ether. | None | |
| VIII | Ketomalonic | $10^{-2}$ | 1-methylcyclohex-2-ene hydroperoxide. | $5 \times 10^{-2}$ | 1,3-diphenyl isobenzofuran. | $10^{-3}$ | Triphenylacetic anhydrie. | $5 \times 10^{-2}$ | Dioxane | $BF_3$ | $10^{-4}$ |
| IX | ...do... | 3 | n-Butyl hydroperoxide. | 1 | 9 cyano anthracene. | $10^{-1}$ | m-Chloro phenyl isocyanate. | 8 | Xylene | Acetic acid | 0.3 |
| X | Tetraketo adipic. | $10^{-4}$ | Peroxy 4-chloro benzoic acid. | $10^{-3}$ | 1 bromo anthracene. | $10^{-4}$ | Caprylic anhydride. | $2.5 \times 10^{-4}$ | Methyl benzoate. | None | |
| XI | Ketomalonic | $5 \times 10^{-2}$ | 1-phenyl 1-methyl propyl hydroperoxide. | $10^{-1}$ | Pentacene | 0.5 | ...do... | $10^{-1}$ | Benzene | Perchloric acid. | 0.6 |
| XII | Oxalic | 0.1 | Dimethyl p-methoxy phenyl methyl hydroperoxide. | $10^{-2}$ | Rubrene | $2 \times 10^{-3}$ | 1-napthyl isocyanate. | 0.2 | Diphenyl ether. | p-Toluene sulfonic acid. | $5 \times 10^{-2}$ |
| XIII | Triketo glutaric. | 0.1 | 2 butanone 3-hydroperoxide. | 0.2 | 9,10 diphenyl anthracene. | $5 \times 10^{-4}$ | Lauric anhydride. | 0.4 | Ethyl acetate. | None | |
| XIV | Oxalic | 0.2 | Allyl hydroperoxide. | 0.2 | Rubrene | $2 \times 10^{-4}$ | n-Butyric anhydride. | 2 | Dimethyl phthalate. | Pyrophosphoric acid. | $10^{-1}$ |

TABLE I—Continued

| Ex. No. | Acid | Conc. | Peroxide | Conc. | Fluorescent Compound | Conc. | Dehydrating Agent | Conc. | Diluent | | Anhydrous Acid Catalyst | Conc. |
|---|---|---|---|---|---|---|---|---|---|---|---|---|
| XV | Dihydroxy tartaric. | 0.1 | Triethylmethyl hydroperoxide. | $10^{-2}$ | Pentaphenyl phosphole. | $5 \times 10^{-3}$ | Triphenyl-acetic anhydride. | 1 | Amyl acetate. | | None | |
| XVI | Ketomalonic. | 0.2 | 9-xanthenyl hydroperoxide. | $10^{-3}$ | 10-methyl 9-acridanone. | $5 \times 10^{-4}$ | Napthalenic anhydride. | 0.8 | Anisole | | do | |
| XVII | Oxalic | 0.1 | 9,10-diphenyl, 9,10 di-hydro-anthracene, 9,10- di-hyd. | 2 | Napthacene | $10^{-2}$ | Phenyl isocyanate. | 0.2 | Benzene | | Phenyl phosphoric acid. | 1 |
| XVIII | Tetraketo adipic. | $2 \times 10^{-3}$ | Insole 3-hydroperoxide. | $2 \times 10^{-3}$ | Benzanthracene. | $10^{-4}$ | Butyl isocyanate. | $5 \times 10^{-3}$ | Cyclohexyl acetate | | Phenyl sulfonic aicd. | $5 \times 10^{-3}$ |
| XIX | Dihydroxy tartaric. | 0.2 | 1,2,3,4 tetra hydrocarbazole 4a hydroperoxide. | 0.1 | 1,4-dimethyl anthracene. | 0.1 | Methyl isocyanate. | 0.5 | t-Butyl benzene. | | p-Toluene sulfonic acid. | $10^{-3}$ |
| XX | Oxalic | 0.4 | 9-amino 10-phenyl anthracene 10-hydroperoxide. | 0.2 | Perylene | 1 | Acetic anhydride. | 1 | Toluene | | None | |
| XXI | do | 0.4 | Hydrogen peroxide. | 1 | 9,10 diphenyl anthracene. | $10^{-4}$ | do | 1 | Benzene | | do | |
| XXII | Ketomalonic. | 0.3 | do | 1 | 9,10 diphenyl anthracene. | $10^{-4}$ | Dicyclohexyl carbodiimide. | 0.8 | Diethyl ether. | | Methane sulfonic acid. | 0.2 |
| XXIII | Dihydroxy tartaric. | 0.2 | do | 1 | 9,10 diphenyl anthracene. | $10^{-4}$ | do | 0.5 | do | | do | 0.2 |

Examples I, XXII, and XXIII demonstrate the use of a carbodiimide as a dehydrating agent.

Examples II, IV, V, VII, VIII, X, XI, XIII, XIV, XV, XVI, XX, and XXI illustrate the use of a carboxylic acid anhydride as a dehydrating agent.

Examples III, VI, IX, XII, XVII, XVIII, and XIX demonstrate the use of an isocyanate as a dehydrating agent.

This example demonstrates that peroxides of the type ROOD' do not give chemiluminescence in the process of this invention (R and R'=alkyl, or aryl, etc.).

EXAMPLE XXXVI

The procedure of Example XXXV was followed except that 4.0 g. (0.01 mole) of dilauroyl peroxide was substi-

TABLE II

| Example No. | (A) Oxalic Acid Conc. | (B) $H_2O_2$ Conc.[1] | (C) Fluorescent Compound Conc. | (D) RN=C=NR' | | Conc. | (E) Diluent Conc.[2] | (F) Anhydrous Acid Catalyst Conc. |
|---|---|---|---|---|---|---|---|---|
| | | | | R | R' | | | |
| XXIV | $10^{-4}$ | Anhydrous $H_2O_2$, $10^{-2}$. | Anthracene, $10^{-3}$. | $CH_3$ | $C_2H_5$ | $10^{-2}$ | Anisole | Methyl sulfonic acid, $10^{-2}$. |
| XXV | 1 | Urea peroxide, 2 | Benzanthracene, 2. | $C_4H_9$ | $C_4H_9$ | 4 | Diamyl ether | Benzene sulfonic acid, $10^{-1}$. |
| XXVI | $10^{-1}$ | Sodium pyrophosphate peroxide, $10^{-3}$. | Phenanthrene, 1. | Phenyl | Phenyl | 3 | Tetrahydrofuran | Phenylphosphonic acid, $10^{-1}$. |
| XXVII | $10^{-3}$ | Urea peroxide, 4 | 9,10-diphenyl anthracene, 1. | Cyclohexyl | Cyclohexyl | $10^{-1}$ | Diethyl ether | |
| XXVIII | 3 | Histidine peroxide, $10^{-1}$. | Pentacene, $10^{-4}$ | $C_8H_{17}$ | $C_8H_{17}$ | 2 | Ethyl acetate | HCl, 0.5. |
| XXIX | 1.5 | Urea peroxide, 1 | Naphthacene, 4 | $C_{14}H_{29}$ | $C_{14}H_{29}$ | 2 | Amyl acetate | |
| XXX | $10^{-1}$ | Sodium pyrophosphate peroxide, $10^{-1}$. | Rubrene, $10^{-3}$ | Cyclopentyl | Cyclopentyl | 1 | Diethyl phthalate | Trifluoroacetic acid, 1. |
| XXXI | $10^{-2}$ | Histidine peroxide, 1. | 1-bromoanthracene, $10^{-2}$. | Phenyl | Phenyl | 1.5 | Methyl benzoate | $BF_3$, $10^{-4}$. |
| XXXII | 2 | Anhydrous $H_2O_2$, 8. | 9-cyanoanthracene. | 3-methyl phenyl. | 3-methyl phenyl. | $10^{-1}$ | Benzene | |
| XXXIII | $10^{-1}$ | Urea, peroxide, 2 | 1, 3-diphenyl-isobenzofuran $10^{-3}$. | $C_6H_{13}$ | $C_6H_{13}$ | $10^{-1}$ | Xylene | Pyrophosphoric acid, $10^{-1}$. |
| XXXIV | $10^{-2}$ | Histidine peroxide, 2. | Trans-stilbene, $10^{-3}$. | $C_2H_5$ | $C_2H_5$ | 6 | Dioxane | Perchloric acid, 0.6. |

[1] $H_2O_2$ as $H_2O_2$—final molar concentration.
[2] Remainder of composition.
[All concentrations are final molar concentrations—i.e., moles of A, B, C, D, or F per liter of E.]

In each of the examples in Table II, above, the component (D) is added last, with the exception of Example XVII in which components (A), (B), (C), and (D) are blended as solids and added to dilute (E). All of these examples generate light of significantly improved intensity and lifetime.

EXAMPLE XXXV

On the addition of 2.2 m. (0.022 mole) of acetic anhydride, to a solution of 1 g. (0.011 mole) of oxalic acid, and 1.46 g. (0.01 mole) of ditertiary butyl peroxide in 25 ml. of benzene containing 5 mg. of 9,10-diphenyl anthacene, no chemiluminescence was observed.

tuted for ditertiary butyl peroxide. No light emission was obtained.

This example demonstrates that peroxides of the type ROOR' do not give chemiluminescence in the process of this invention

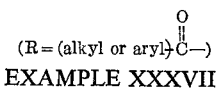

(R = (alkyl or aryl)-C—)

EXAMPLE XXXVII

The substitution of 0.23 g. (0.001 mole) of ditertiary butyl peroxylate for ditertiary butyl peroxide in the process described in Example XXXV failed to produce chemiluminescence.

This example demonstrates that peroxides of the type ROOR' do not give chemiluminescence in the process of this invention (R=alkyl, or aryl, etc.).

EXAMPLE XXXVIII

The procedure of Example XXXV was followed except that 1.8 g. (0.01 mole) of acetyl benzoyl peroxide replace ditertiary butyl peroxide. No light emission was observed.

This example demonstrates that peroxide of the type ROOR' do not give chemiluminescence in the process of this invention

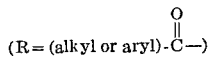
(R = (alkyl or aryl)-C—)

EXAMPLE XXXIX

A solution of 1 g. (0.001 mole) of oxalic acid, 0.9 g. (0.01 mole) of tertiary butyl hydroperoxide, and 5 mg. of 9,10-diphenyl anthracene in 25 ml. of benzene was poured into a flask containing 3.0 g. (0.021 mole) of $P_2O_5$. No chemiluminescence was observed.

This example demonstrates that inorganic acid anhydrides do not work in the process of this invention.

EXAMPLE L

The procedure of Example XXXIX was followed except that 4.1 g. (0.03 mole) of phenyl isothiocyanate replaced the $P_2O_5$. No light emission was obtained.

Examples in Table I illustrate the use of isocyanates as dehydrating agents in the process of this invention.

This example demonstrates that an isothiocyanate does not successfully replace an isocyanate in this process.

EXAMPLE LI

The procedure of Example XXXIX was followed except that 3.5 g. (0.03 mole) of n-butyl isothiocyanate replaced the $P_2O_5$. No chemiluminescence was obtained.

Examples in Table I illustrate the use of isocyanates as dehydrating agents in the process of this invention. This example also demonstrates that an isothiocyanate does not successfully replace an isocyanate in this process.

According to still another embodiment of the instant discovery, it has been found that where all the components, viz., (A), (B), (C), (D) and if desired, (F), are solids, a diluent need not be added in order to provide light emission. For example, the following composition generates significant visible light when the blended solids are subjected to friction, such as that provided by a spatula upon mixing or such as that provided by rubbing the solids on a hard surface:

| | Grams |
|---|---|
| Oxalic acid | 1.0 |
| Sodium pyrophosphate peroxide | 6.0 |
| 9,10-diphenylanthracene | 0.05 |
| Para-toluenesulfonic acid | 0.1 |
| Dicyclohexylcarbodiimide | 3.0 |

Obviously, the invention is not restricted to this particular blend of solids but to any blend of solids producible from the components contemplated herein.

It is within the scope of this invention to make such modifications of the compositions and processes disclosed herein as would be obvious to a person of ordinary skill in this art, and it is to be understood that the examples illustrating this invention are intended to limit the invention only insofar as is stated in the specification and as the following claims are limited. Also, it is within the scope of this invention to form an apparatus such as a container or (1) insoluble or (2) dissolvable capsule in which the reactant of this invention is enclosed for subsequent reaction with the other ingredients necessary to produce chemiluminescent energy and light.

We claim:
1. A chemiluminescent composition comprising (1) a dicarboxylic acid of the formula:

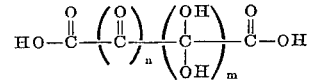

wherein $n$ and $m$ are each respectively an integer less than about 11, including zero, (2) a substantially anhydrous hydroperoxide, (3) a diluent, and (4) a dehydrating agent selected from the group consisting of (a) a carbodiimide of the typical formula RN=C=NR' wherein R and R' each respectively are selected from the group consisting of alkyl ($C_1$–$C_{16}$), aryl, cycloalkyl, heterocyclic, substituted alkyl, substituted aryl, substituted cycloalkyl, and substituted heterocyclic, (b) an anhydride of carboxylic acid, (c) an isocyanate, (d) an anhydride of R-substituted carboxylic acid wherein R is as defined above, and (e) an R-substituted isocyanate wherein R is as defined above.

2. The composition of claim 1 including a fluorescent compound having a spectral emission falling between 330 millimicrons and 700 millimicrons.

3. The composition of claim 1 wherein the peroxide is $H_2O_2$ and wherein said diluent has a solubility of $H_2O_2$ in the diluent of at least one gram of $H_2O_2$ per liter of said diluent.

4. The composition of claim 1 wherein said hydroperoxide comprises a perhydrate.

5. The composition of claim 1 wherein said dicarboxylic acid is oxalic acid.

6. The composition of claim 5 wherein said hydroperoxide comprises a perhydrate.

7. The composition of claim 6 including a fluorescent compound.

8. The composition of claim 1 wherein for said carbodiimide, R and R' each represent cyclohexyl.

9. A method producing chemiluminescent light comprising admixing reactants comprising (1) a dicarboxylic acid of the formula:

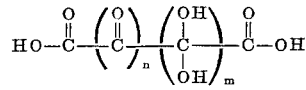

wherein $n$ and $m$ are each respectively an integer less than about 11, including zero, (2) a substantially anhydrous hydroperoxide, (3) a diluent, and (4) a dehydrating agent selected from the group consisting of (a) a carbodiimide of the typical formula RN=C=NR' wherein R and R' each respectively are selected from the group consisting of alkyl ($C_1$–$C_{16}$), aryl, cycloalkyl, heterocyclic, substituted alkyl, substituted aryl, substituted cycloalkyl, and substituted heterocyclic, (b) an anhydride or carboxylic acid, (c) an isocyanate, (d) an anhydride of R-substituted carboxylic acid wherein R is as defined above, and (e) an R-substituted isocyanate wherein R is as defined above.

10. The method of claim 9 in which anhydrous acid catalyst is added in a small amount sufficient to be effective.

11. The method of claim 9 in which the dicarboxylic acid comprises oxalic acid.

12. A substantially solid chemiluminescent composition comprising (1) a solid dicarboxylic acid of the formula:

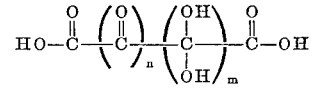

wherein $n$ and $m$ are each respectively an integer less than about 11, including zero, (2) a substantially anhydrous and solid hydroperoxide, and (3) a substantially solid dehydrating agent selected from the group consisting of (a) a carbodiimide of the typical formula RN=C=NR' wherein R and R' each respectively are selected from the group consisting of alkyl ($C_1$–$C_{16}$), aryl, cycloalkyl, heterocyclic, substituted alkyl, substituted aryl, substituted cycloalkyl, and substituted heterocyclic, (b) an anhydride of carboxylic acid, (c) an isocyanate, (d) an anhydride of R-substituted carboxylic acid wherein R is as defined above, and (e) an R-substituted isocyanate wherein R is as defined above.

13. A method producing chemiluminescent light comprising (A) in the absence of a diluent, admixing (1) a solid dicarboxylic acid of the formula:

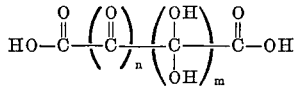

wherein $n$ and $m$ are each respectively an integer less than about 11, including zero, (2) a substantially anhydrous solid hydroperoxide, and (3) a solid dehydrating agent selected from the group consisting of (a) a carbodiimide of the typical formula RN=C=NR' wherein R and R' each respectively are selected from the group consisting of alkyl ($C_1$–$C_{16}$), aryl, cycloalkyl, heterocyclic, substituted alkyl, substituted aryl, substituted cycloalkyl, and substituted heterocyclic, (b) an anhydride of carboxylic acid, (c) an isocyanate, (d) an anhydride of R-substituted carboxylic acid wherein R is as defined above, and (e) an R-substituted isocyanate wherein R is as defined above, and (B) subjecting said admixture to friction.

14. A chemiluminescent composition comprising (1) a dicarboxylic acid of the formula:

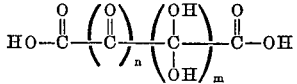

wherein $n$ and $m$ are each respectively an integer less than about 11, including zero, (2) a substantially anhydrous hydroperoxide, (3) a dehydrating agent selected from the group consisting of (a) a carbodiimide of the typical formula RN=C=NR' wherein R and R' each respectively selected from the group consisting of alkyl ($C_1$–$C_{16}$), aryl, cycloalkyl, heterocyclic, substituted alkyl, substituted aryl, substituted cycloalkyl, and substituted heterocyclic, (b) an anhydride of carboxylic acid, (c) an isocyanate, (d) an anhydride of R-substituted carboxylic acid wherein R is as defined above, and (e) an R-substituted isocyanate wherein R is as defined above.

15. A method producing chemiluminescent light comprising (A) in the absence of a diluent, admixing (1) a solid dicarboxylic acid of the formula:

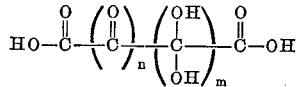

wherein $n$ and $m$ are each respectively an integer less than about 11, including zero, (2) a substantially anhydrous solid hydroperoxide, (3) a solid dehydrating agent selected from the group consisting of (a) a carbodiimide of the typical formula RN=C=NR' wherein R and R' each respectively are selected from the group consisting of alkyl ($C_1$–$C_{16}$) aryl, cycloalkyl, heterocyclic, substituted alkyl, substituted aryl, substituted cycloalkyl, and substituted heterocyclic. (b) an anhydride of carboxylic acid, (c) an isocyanate, (d) an anhydride of R-substituted carboxylic acid wherein R is as defined above, (e) an R-substituted isocyanate wherein R is as defined above, and (4) an anhydrous acid catalyst in an amount sufficient to be effective, and (B) subjecting said admixture to friction.

16. The composition of claim 4 containing a small but effective amount of anhydrous acid catalyst.

17. A chemiluminescent composition comprising (1) a dicarboxylic acid of the formula:

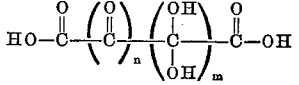

wherein $n$ and $m$ are each respectively an integer less than about 11, including zero, and (2) at least one additional chemiluminescent reactant.

18. A composition according to claim 16, in which at least one R-substituent is a fluorescent compound.

19. A method according to claim 15, in which at least one R-substituent is a fluorescent compound.

No references cited.

LEON D. ROSDOL, *Primary Examiner.*

J. D. WELSH, *Assistant Examiner.*